United States Patent
Fledersbacher et al.

(10) Patent No.: US 6,378,307 B1
(45) Date of Patent: Apr. 30, 2002

(54) INTERNAL COMBUSTION ENGINE WITH AN EXHAUST GAS TURBOCHARGER, AND ASSOCIATED METHOD

(75) Inventors: Peter Fledersbacher; Siegfried Sumser; Juergen Willand; Friedrich Wirbeleit, all of Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/714,659

(22) Filed: Nov. 17, 2000

(30) Foreign Application Priority Data

Nov. 18, 1999  (DE) .......................... 199 55 508

(51) Int. Cl.⁷ .............................................. F02B 33/44
(52) U.S. Cl. .................... 60/605.2; 60/611; 60/612; 60/602; 123/559.1
(58) Field of Search ................ 60/605.2, 602, 60/611, 612; 123/559.1

(56) References Cited

U.S. PATENT DOCUMENTS

| | | | | |
|---|---|---|---|---|
| 4,150,545 A | * | 4/1979 | Yamazaki | 60/611 |
| 4,693,085 A | * | 9/1987 | Sumser | 60/611 |
| 4,719,758 A | * | 1/1988 | Sumser | 60/611 |
| 5,142,866 A | * | 9/1992 | Yanagihara et al. | 60/605.2 |
| 5,406,796 A | * | 4/1995 | Hiereth et al. | 60/605.2 |
| 5,461,860 A | * | 10/1995 | Schegk | 60/611 |

FOREIGN PATENT DOCUMENTS

| | | |
|---|---|---|
| DE | 4213047 A1 | 10/1993 |
| JP | 0010315616 | 12/1989 |
| JP | 4-19328 A | 1/1992 |

* cited by examiner

*Primary Examiner*—Thomas Denion
*Assistant Examiner*—Thai-Ba Trieu
(74) *Attorney, Agent, or Firm*—Crowell & Moring LLP

(57) ABSTRACT

An internal combustion engine has an exhaust gas turbocharger with an exhaust gas turbine and a compressor. In addition, an air-driven turbine is provided which is torsionally connected to the compressor and to which combustion air can be supplied via an adjustable shut-off element. For operation of the exhaust gas turbocharger over a wide operating spectrum, an additional duct is provided between compressor inlet and the air inlet of the air turbine, the air supply in the additional duct being adjustable by the shut-off element. In the lower load range, in the case where the required boost pressure falls below a threshold value, the additional duct is opened by means of the shut-off element and the air supply to the compressor inlet is reduced.

25 Claims, 4 Drawing Sheets

INTERNAL COMBUSTION ENGINE WITH AN EXHAUST GAS TURBOCHARGER, AND ASSOCIATED METHOD

BACKGROUND AND SUMMARY OF THE INVENTION

This application claims the priority of application number 199 55 508.7, filed in Germany, Nov. 18, 1999, the disclosure of which is expressly incorporated by reference herein.

The invention relates to an internal combustion engine with an exhaust gas turbocharger, and an associated method. Preferred embodiments relate to an exhaust gas turbocharger, which comprises an exhaust gas turbine and a compressor for generating compressed boost air, having an additional, air-driven turbine, which is torsionally connected to the compressor and to which combustion air can be supplied via an adjustable shut-off element, a turbine outlet of the air-driven turbine being connected by a connecting duct to the induction path downstream of the compressor and having a closed-loop and open-chain control unit for generating setting signals which adjust the shut-off element.

An exhaust gas turbocharger for an internal combustion engine is known from German Patent Document DE 42 13 047 A1, whose exhaust gas turbine is driven by the exhaust gas back pressure and drives, via a connecting shaft, a compressor for generating increased boost pressure. In order to improve the transient behavior of the exhaust gas turbocharger, compressed air from a pressure reservoir in the compressor inlet can be fed in via an additional duct to support the run-up of the supercharger to higher peripheral speeds; at the same time, a throttle upstream of the compressor inlet is displaced into the shut-off position in order to prevent the compressed air fed in at a positive pressure from escaping to the atmosphere via the intake line.

By means of this exhaust gas turbocharger, it is in fact possible to increase the supercharger rotational speed even at low-load operating points, at which only a small exhaust gas back pressure is built up, by feeding in additional compressed air. In this way, delays in the build-up of pressure, which may be attributed to a delay in the increase in the supercharger rotational speed due to inertia, can be reduced. This advantage must, however, be purchased at the cost of a high level of structural complication. In particular, it is necessary to ensure a sufficiently high positive pressure in the pressure reservoir, for which purpose an additional compressor, including the drive unit necessary for the compressor, is required.

In order to improve the response behavior of exhaust gas turbochargers, the inertia of the superchargers has been previously reduced by a reduction in size and a lighter design by means, in particular, of reducing the turbine impeller diameter. As a result of the smaller mass moment of inertia of the supercharger rotor, the delay in the build-up of boost pressure is reduced and, correspondingly, a higher engine torque can be built up in a shorter time. The reduction in the impeller volume of the supercharger rotor can, however, lead to a deterioration in the efficiency of the exhaust gas turbocharger. A further problem associated with relatively small exhaust gas turbocharger designs is the high supercharger rotational speeds and, in particular, the large rotational speed range which has to be overcome by the supercharger rotor between lower engine load and full load.

A further exhaust gas turbocharger device of the generic type is revealed in Japanese Patent Document JP 10-315 616 A1. Associated with the exhaust gas turbocharger described in this publication is an additional, air-driven turbine, which is seated on the same drive shaft as the exhaust gas turbine and the compressor and is capable of supplying drive power to the compressor. The air-driven turbine is fed with compressed air from a compressed air reservoir and the expanded air at the turbine outlet of the air turbine is combined with the compressed air from the compressor and subsequently introduced into the air inlet of the internal combustion engine.

The compressed-air driven turbine is switched on in the lower load range, during which an exhaust gas back pressure sufficient for driving the exhaust gas turbine is not yet available or is just being built up, so that the rotor of the exhaust gas turbocharger can be accelerated to higher revolutions despite a low exhaust gas back pressure. Although this appliance makes it possible to build up an exhaust gas turbocharger rotor rotational speed sufficient for a build-up of boost pressure over a wide operating range of the internal combustion engine, an additional compressed air reservoir, including the associated drive units, must again be considered as reservations with respect to the appliance as described in this JP 10-315 616 A1.

The invention is based on the problem of improving the efficiency of an exhaust gas turbocharger by simple means.

This problem is solved, in accordance with the invention, by providing an arrangement of the above referred to type, wherein an additional duct is provided between the compressor inlet or a line section opening into the compressor inlet and the air inlet of the air-driven turbine, wherein the air supply in the additional duct and in the compressor inlet can be adjusted by the shut-off element, and wherein in a lower load range, in a case where required boost pressure falls below a threshold value, a setting signal is generated in the closed-loop and open-chain control unit, which setting signal adjusts the shut-off element into a position opening the additional duct and reducing the air supply to the compressor inlet.

This problem is also solved by a method of operating an internal combustion engine having an exhaust gas turbocharger with an exhaust gas turbine and a compressor for generating compressed boost air, having an additional, air-driven turbine, which is torsionally connected to the compressor and to which combustion air can be supplied via an adjustable shut-off element, the turbine outlet being connected to a duct section communicating with the compressor outlet, wherein, in a lower load range, in a case where the required boost pressure falls below a threshold value, at least a partial flow of the induced combustion air is guided via the air-driven turbine.

The novel internal combustion engine comprises an exhaust gas turbocharger which has an additional duct between the compressor inlet and the air inlet of the air-driven turbine, it being possible to adjust the air supply to the additional duct and also to the compressor inlet by a shut-off element, as a function of the operating condition of the internal combustion engine. This embodiment offers the advantage that the supply of combustion air to both the compressor and the air-driven turbine can take place via a common induction duct. The feed to the compressor and/or to the air turbine takes place by means of the adjustment of the shut-off element, which is, in particular, arranged in the region where the additional duct branches off from the induction duct and which permits an adjustment of the air flow both through the additional duct and through the induction duct directly into the compressor inlet. As a departure from the prior art, no additional pressure reservoirs and no units generating compressed air are necessary in this embodiment so that the design is substantially simplified.

For the case where, in the lower load range, the required boost pressure determined in a closed-loop and open-chain control unit falls below a threshold value, the shut-off element is adjusted into a position opening the additional duct and reducing, in particular shutting off, the air supply to the compressor inlet. This achieves the effect that, even in the low-load range, the rotor rotational speed of the exhaust gas turbocharger is raised to such an extent that the compressor can generate an appreciable compressor output and the rotational speed can be sufficiently raised within a short time for the desired build-up of boost pressure to be realized. The supercharger rotational speed is held at a comparatively high level, even at low-load operating points, so that the transient behavior of the exhaust gas turbocharger is clearly improved; in addition, the supercharger rotational speed range between low-load operating points and high-load operating points is reduced. This makes it possible to employ exhaust gas turbochargers of larger design and correspondingly increased mass moment of inertia; these exhibit design and thermodynamic advantages and are, in particular, characterized by an improved efficiency, by which means the consumption and emission behavior of the internal combustion engine is also improved.

In a preferred embodiment, the air-driven turbine and the compressor form a common component, the additional duct, which branches off from the induction duct upstream of the compressor inlet, opening into the compressor inlet level with the compressor impeller. This design embodiment makes it possible, without reversal of the direction of rotation of the supercharger rotor, to employ the compressor as an air-driven turbine at certain operating points of the internal combustion engine—low-load and/or small required boost pressure—because, due to the different supply of air to the turbine impeller in the compressor, different pressure relationships are created which permit use either as a compressor or as a turbine. In the low-load ranges, it is possible to realize a pressure drop across the compressor in which a higher pressure is present at the compressor inlet than at the compressor outlet. Because of this pressure drop, throttling is achieved across the compressor (or air turbine) and this, in low-load ranges, is sufficient to generate a necessary induction depression. This, as appropriate, makes it possible to dispense with a throttle butterfly, for adjusting the induction pipe pressure, in the induction pipe of the internal combustion engine.

In the compressor, it is expedient to introduce a throttle device in the compressor inlet in the region where the additional duct emerges, which throttle device supports the formation of a pressure drop between the opening of the additional duct into the compressor inlet and the compressor outlet, this permitting operation of the compressor as an air-driven turbine.

In a preferred embodiment, the throttle device is a variably adjustable guide vane cascade, which is adjustably configured in the opening region between the additional duct and the turbine or compressor inlet. This corresponds to an embodiment of a turbine with variable turbine geometry. In the operating range below the threshold value of the required boost pressure, the opening cross section can be adjusted, by altering the position of the guide vane cascade, to set the desired required boost pressure in the induction path of the internal combustion engine. Adjustable guide vanes are advantageously allocated to the guide vane cascade, an adjustable shut-off element being provided in the opening region, in accordance with a further advantageous embodiment, in particular an axially displaceable matrix with recesses for accommodating the guide vane cascade and by means of which complete closure of the opening cross section is possible.

In the embodiment as a shut-off element with recesses for accommodating the guide vane cascade, an additional degree of freedom is provided with respect to the adjustment of the opening cross section, it being possible, in the axially displaceable embodiment of the shut-off element, to adjust the inlet location of the additional duct into the compressor inlet axially with respect to the compressor impeller. By this means, particularly for the case where the compressor is simultaneously the air turbine, the incident flow of the induction air onto the rotor, and therefore the turbine behavior of the compressor, can be influenced.

As an alternative to or additionally to the embodiment where compressor and air turbine form a common component, it is also contemplated to embody the air turbine as an autonomous component independent of the compressor. This has the advantage that use can be made of substantially conventional turbine types which are only connected to the compressor impeller in the direction of rotation.

In accordance with a further advantageous feature of preferred embodiments, the induction air to be supplied to the air turbine is first preheated in a heat exchanger, by which means the pressure level upstream of the turbine rotor is increased and the pressure drop over the rotor of the air turbine is increased.

Other objects, advantages and novel features of the present invention will become apparent from the following detailed description of the invention when considered in conjunction with the accompanying drawings.

DETAILED DESCRIPTION OF THE DRAWINGS

In the embodiment examples represented in FIGS. 1 to 4, similar components are provided with the same reference number designations.

Figure 1:
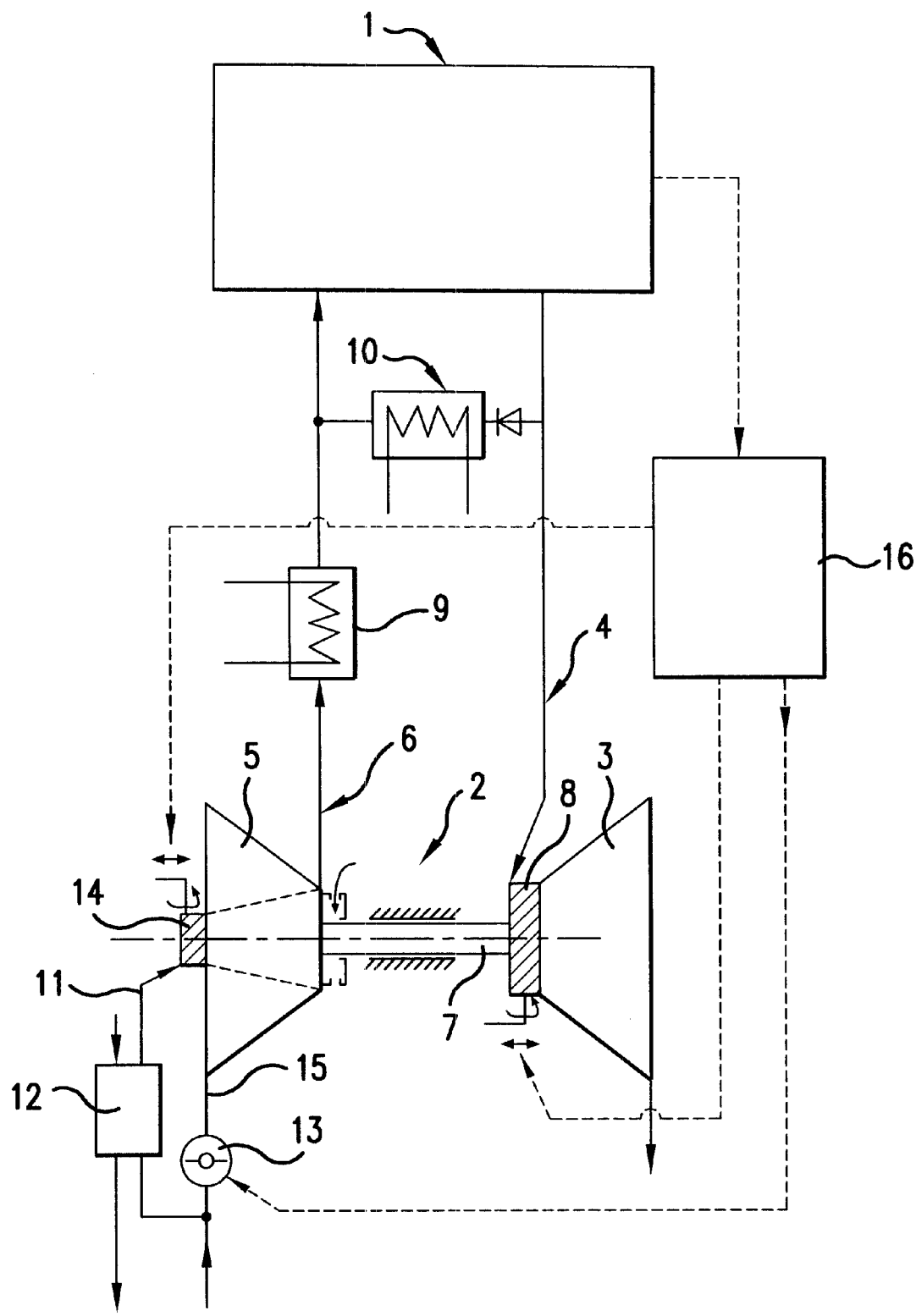
FIG. 1 shows a diagrammatic representation of a supercharged internal combustion engine with an air turbine integrated in the compressor, constructed according to a preferred embodiment of the present invention.

The internal combustion engine 1 represented in FIG. 1, which can be either a diesel internal combustion engine or an external-ignition engine, comprises an exhaust gas turbocharger 2 with an exhaust gas turbine 3 in the exhaust gas train 4 of the internal combustion engine and a compressor 5 in the induction path 6 of the internal combustion engine 1. During operation of the internal combustion engine, the exhaust gas turbine 3 is driven by the pressure built up in the exhaust gases in the line section of the exhaust gas train 4 located upstream of the exhaust gas turbine 3; the motion of the rotor of the exhaust gas turbine 3 is transmitted via a shaft 7 to the compressor impeller of the compressor 5, whereupon a positive boost pressure is built up in the induction path 6 downstream of the compressor 5, which boost pressure can be supplied to the internal combustion engine. So that the power output of the exhaust gas turbocharger can be precisely adjusted in the fired mode of operation and, in addition, so that the exhaust gas turbocharger can also be employed in engine brake operation, the exhaust gas turbine 3 is equipped with a variably adjustable turbine geometry 8, which is configured in particular as an adjustable guide vane cascade. In addition, a boost air cooler 9 is provided in the induction path 6 downstream of the compressor 5 and an exhaust gas recirculation system 10 is provided between the line section of the exhaust gas train 4 located upstream of the exhaust gas turbine 3 and the line section of the induction path 6 located downstream of the compressor 5, the exhaust gas recirculation system 10 additionally containing a heat exchanger for cooling the recirculated exhaust gas.

In order to improve the transient behavior of the exhaust gas turbocharger 2, the exhaust gas turbocharger 2 has additional components at the compressor end and a special design of the compressor 5, by which means turbine operation of the compressor 5 can be realized in a certain operating range of the internal combustion engine 1. For this purpose, an additional duct 11, which branches off from the induction path 6, is provided upstream of the compressor 5 and this additional duct 11 opens into the compressor 5 directly into the compressor inlet in the region of the compressor impeller. A heat exchanger 12 is optionally arranged in the additional duct 11. This heat exchanger 12 is configured as a uniflow or counterflow heat exchanger and expediently transmits heat energy of the exhaust gas from the line section downstream of the exhaust gas turbine 3 to the fresh air to be supplied through the additional duct 11. In addition, a shut-off element 13 is arranged in the induction path 6 upstream of the compressor 5, by means of which shut-off element 13 the induced fresh air flow can be proportionally distributed to the additional duct 11 and the line section 15 between the shut-off element 13 and the compressor 5. The shut-off element 13 can also be adjusted in such a way that the additional duct 11 is completely shut off and the whole of the fresh air flow is guided through the line section 15 or in such a way that the line section 15 is shut off and the whole of the fresh air flow is guided through the additional duct 11.

An adjustable throttle device 14 is provided in the region where the additional duct 11 opens into the compressor 5. This adjustable throttle device 14 causes a build-up of pressure in the additional duct 11 upstream of the throttle device because the opening cross section of the additional duct 11 into the compressor inlet is reduced. The level of the build-up of pressure can be varied by variable adjustment of the throttle device 14. In addition, a closed-loop and open-chain control unit 16 is provided which generates setting signals for the adjustment of the variable setting devices 8, 13, 14 as a function of the operating condition of the signals representing the internal combustion engine.

In the fired driving mode of operation, the compressor 5 can be used as an air turbine by a corresponding adjustment of the shut-off element 13 and of the throttle device 14, the air turbine acting as a throttle in the induction path 6 so that, as appropriate, it is possible to dispense with a separately configured throttle butterfly in the induction path of the internal combustion engine. The decision as to whether the structural unit 5 is employed as a compressor or as an air turbine is made as a function of the current operating condition of the internal combustion engine 1.

Should a required boost pressure, which is below a specified or determined threshold value, be established in the closed-loop and open-chain control unit 16, a setting signal acting on the shut-off element 13 in the line section 15 of the induction path 6 located upstream of the compressor 5 is generated in the closed-loop and open-chain control unit 16. The consequence of this setting signal is a reduction or, if appropriate, shut-off of the line section 15 and, simultaneously, opening of the additional duct 11, so that the induced combustion air is supplied to the compressor 5 through the additional duct 11 while bypassing the main inlet opening of the compressor 5. The pressure of the combustion air supplied via the additional duct 11 builds up at the throttle device 14 in the region where the additional duct 11 opens into the compressor inlet, the position of the throttle device 14 being determined by the closed-loop and open-chain control unit 16 as a function of the current operating condition of the internal combustion engine. The structural unit 5, which is employed as a turbine in this mode of operation, acts as a throttle and, in consequence, a pressure drop is realized between the input end and the output end of the compressor 5 so that a depression can be set in particular in the lower load range in the line section of the induction path 6 located downstream of the compressor 5. In addition, the pressure drop is used to generate energy of motion of the component 5 employed as a turbine, so that the supercharger rotor can be brought to a relatively high rotational speed even in the lower load range. Provided the required boost pressure determined in the closed-loop and open-chain control unit 16 is above the threshold value, the shut-off element 13 is displaced into a position which shuts off the additional duct 11 and frees the line section 15 upstream of the compressor 5, so that the induced combustion air is supplied via the main inlet opening to the compressor 5 and the compressor 5 effects a compression to an increased boost pressure.

It can, under certain circumstances, be expedient to permit a mixed or transition condition in a pressure range above the threshold value and directly adjacent to the threshold value, in which mixed or transition condition, a partial air flow is guided both through the additional duct 11 and through the line section 15. The mixed operation can be maintained in a required pressure section between the threshold value and a limiting value located above it.

Figure 2:
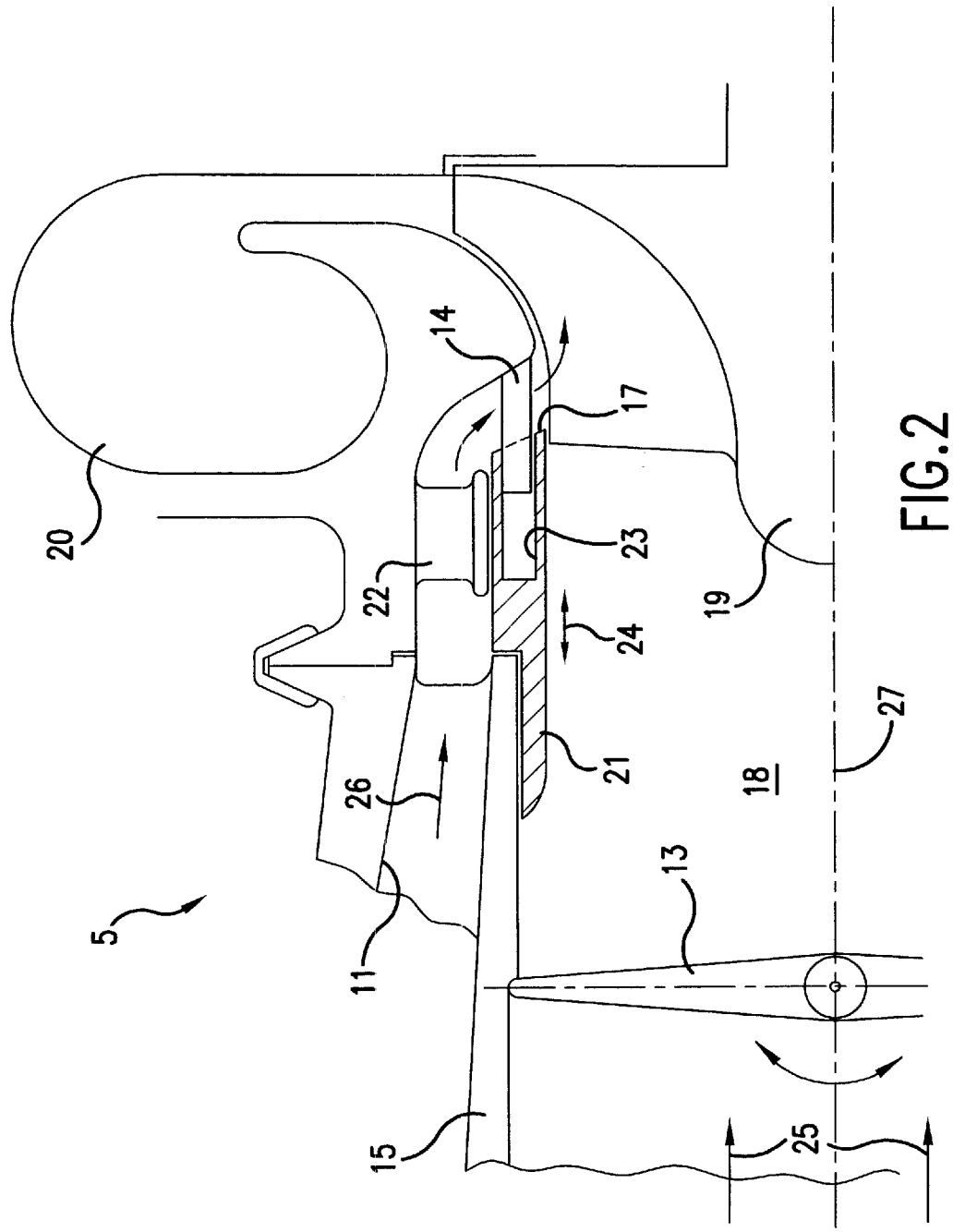
FIG. 2 shows a section through the compressor with integrated air turbine of the arrangement of FIG. 1 in an enlarged representation.

The employment of the compressor as a turbine in the lower load range is, in particular, provided in the fired mode of operation. In addition, however, it can also be expedient to provide a corresponding employment in engine brake operation. It may be seen from the sectional representation of the compressor 5, as shown in FIG. 2, that the shut-off element 13, which is configured as a throttle butterfly, is arranged in the line section 15 of the induction path 6 immediately before the compressor inlet 18, which shut-off element 13 is to be pivoted about a transverse center line at right angles to the compressor longitudinal center line 27. In an open position of the shut-off element 13, the induced combustion air flows in the arrow direction 25—the main inlet flow direction—into the compressor inlet 18 and meets the compressor impeller 19, which is driven by the turbine of the exhaust gas turbocharger in the usual mode of operation of the compressor 5. The combustion air entering the compressor inlet experiences a compression due to the rotation of the compressor impeller 19 and leaves the compressor 5 via the diffuser 20 and the volute and is subsequently fed, after cooling in the boost air cooler, to the induction pipe of the internal combustion engine.

In order to permit turbine operation also, an additional duct 11 is provided radially outside the compressor inlet 18 in the compressor casing, through which additional duct 11 fresh air is supplied to the compressor in the flow direction 26 in a shut-off position of the shut-off element 13. The additional duct 11 opens into the compressor inlet 18 via an outlet opening 17 in the region of the compressor impeller 19, the flow direction of the air flowing into the compressor inlet via the outlet opening 17 enclosing an angle with the longitudinal center line 27 of the compressor because of an angled supply as a result of a bent final section of the additional duct 11. Because of the angular inclusion and the axial position of the outlet opening 17 in the region of the compressor impeller 19, the compressor 5 acts as a turbine during a supply of fresh air in the arrow direction 26 through the additional duct 11, the direction of rotation of the turbine wheel 19 being maintained. In turbine operation also, the air to be supplied via the additional duct 11 is led away, in the same manner as in compressor operation, via the diffuser and the volute.

A swirl and throttle device 14 is provided in the opening region 17 to support the turbine effect, which swirl and throttle device 14 is configured, in particular, as a guide vane cascade with adjustable guide vanes. The throttle device 14 can be acted upon by a setting element (not shown) in order to increase or decrease the cross section of the outlet opening 17 or to supply a swirl, which supports the mode of operation as a turbine, to the air flowing in when it passes the outlet opening 17. Also provided is a shut-off element 21 which can be displaced axially in the arrow direction 24, which shut-off element 21 is axially adjacent to the guide vane cascade 14 and is equipped with acceptance features 23 for accommodating the guide vane cascade 14. One end of the shut-off element 21 forms a side wall of the outlet opening 17. The shut-off element 21, which is guided by a bearing arrangement 22, can be displaced sufficiently far axially to completely close the outlet opening 17. This position is set, particularly in the compressor mode of operation, in order to avoid erroneous air flows from the compressor inlet back into the additional duct 11. In addition, the axial incident flow to the compressor impeller 19 can be influenced by means of the position of the shut-off element 21.

Figure 3:
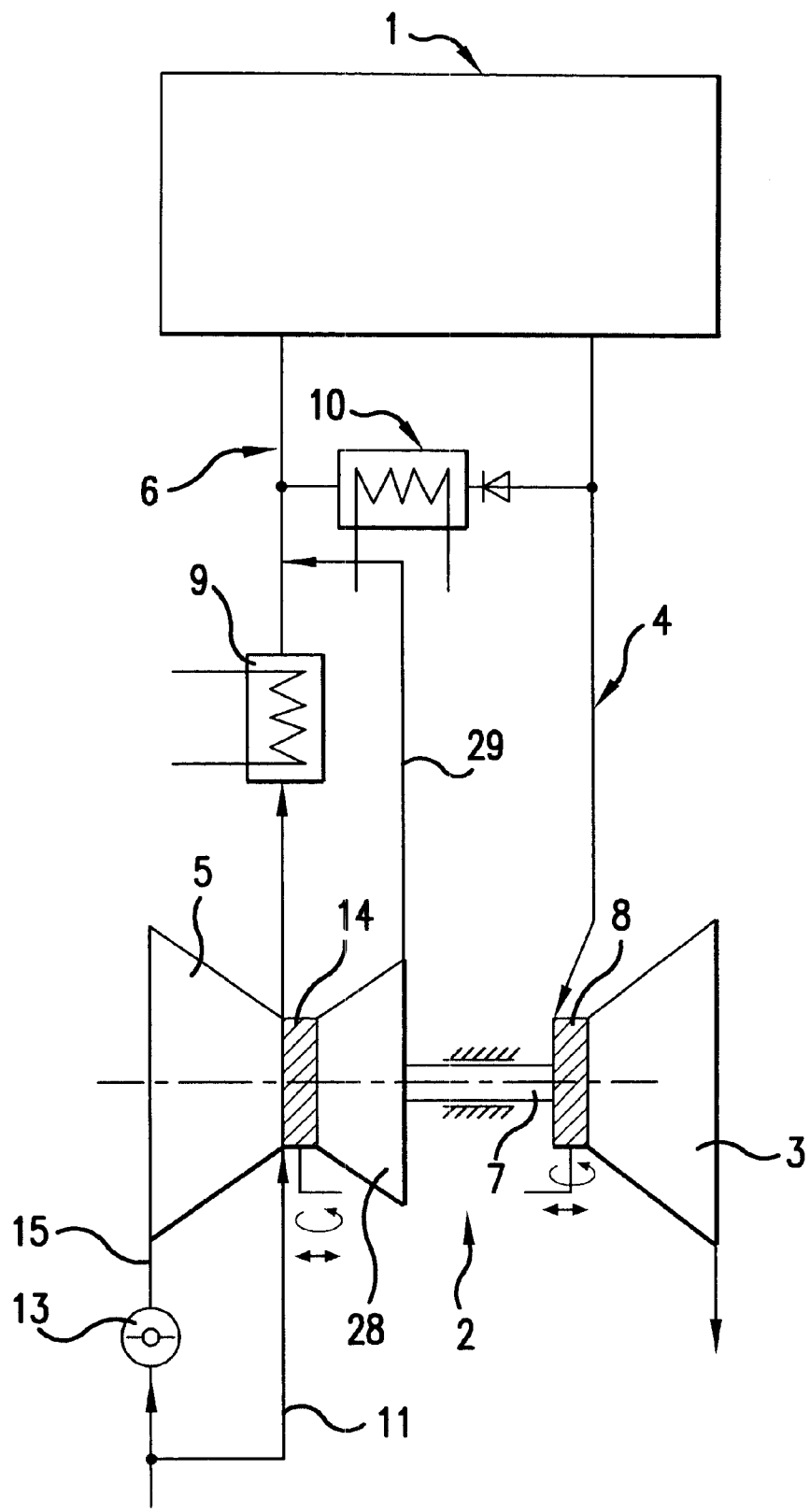
FIG. 3 shows a diagrammatic representation of a supercharged internal combustion engine with a separately configured air turbine on the back of the compressor, constructed according to another preferred embodiment of the invention.

In the embodiment of FIG. 3, the exhaust gas turbocharger 2 has an exhaust gas turbine 3 with variable turbine geometry 8 and a conventional compressor 5, which is arranged in the induction path 6, a shut-off element 13 being provided in the line section 15 upstream of the compressor 5. The additional duct 11 branches off from the induction path 6 upstream of the shut-off element 13, the shut-off element 13 being adjusted, in the case of a required boost pressure below a threshold value, in such a way that the combustion air to be supplied is fed through the additional duct 11. An air turbine 28, which is torsionally connected to the compressor 5, is seated on the shaft 7 of the exhaust gas turbocharger 2 on the rear side of the compressor 5. In this embodiment, the air turbine 28 is an autonomous component configured separately from the compressor 5. The air inlet of the air turbine 28 communicates with the additional duct 11 and the air outlet of the air turbine 28 is connected to the induction path 6 via a connecting line 29, the connecting line 29 opening, in particular, into the induction path 6, downstream of the boost-air cooler 9.

In the case of a required boost pressure below the specified threshold value, the combustion air is fed through the additional duct 11 and through the air turbine 28, by which means a pressure drop occurs in the line section of the induction path 6 downstream of the air turbine 28. In this arrangement, the power of the air turbine 28 is transmitted to the compressor 5, because of the torsional connection. The pressure drop can be controlled by means of the throttle device 14 of the air turbine 28.

Above the threshold value, the shut-off element 13 is adjusted in such a way that the additional duct 11 is shut off so that the air turbine 28 cannot deliver any power. At the same time, the line section 15 to the compressor 5 is opened, the compressor 5 now being driven by the exhaust gas turbine 3 and the induced combustion air being compressed to an increased boost pressure.

Figure 4:
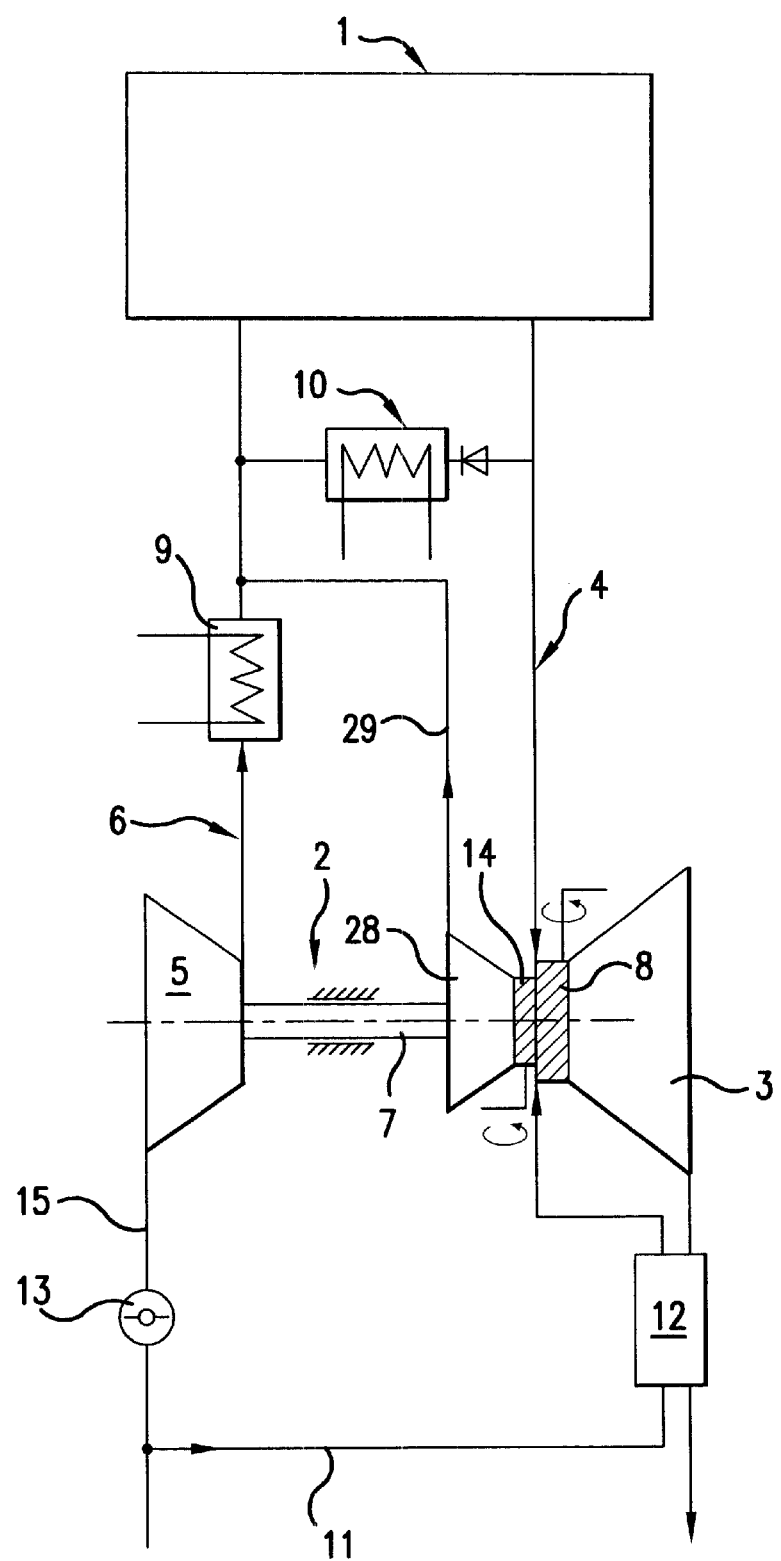
FIG. 4 shows an embodiment corresponding to FIG. 3 but with the air turbine on the back of the exhaust gas turbine.

The embodiment of FIG. 4 is similar to that of FIG. 3 but with the difference that the air turbine 28 is arranged on the back of the exhaust gas turbine 3 and is torsionally connected to the exhaust gas turbine 3. A heat exchanger 12, by means of which residual heat from the exhaust gases downstream of the exhaust gas turbine 3 can be transmitted to the fresh air to be supplied, can be provided in the additional duct 11 for preheating the induced fresh air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Internal combustion engine with an exhaust gas turbocharger, which comprises an exhaust gas turbine and a compressor for generating compressed boost air, having an additional, air-driven turbine, which is torsionally connected to the compressor and to which combustion air can be supplied via an adjustable shut-off element, a turbine outlet of the air-driven turbine being connected by a connecting duct to the induction path downstream of the compressor and having a closed-loop and open-chain control unit for generating setting signals which adjust the shut-off element, wherein an additional duct is provided between the compressor inlet or a line section opening into the compressor inlet and the air inlet of the air-driven turbine, wherein the air supply in the additional duct and in the compressor inlet can be adjusted by the shut-off element, and wherein in a lower load range, in a case where required boost pressure falls below a threshold value, a setting signal is generated in the closed-loop and open-chain control unit, which setting signal adjusts the shut-off element into a position opening the additional duct and reducing the air supply to the compressor inlet.

2. Internal combustion engine according to claim 1, wherein the air-driven turbine and the compressor are configured as a one-piece component with a common casing, and wherein the additional duct opens into the compressor inlet level with the compressor impeller.

3. Internal combustion engine according to claim 2, wherein the inlet flow direction encloses an angle with the main flow direction through the compressor or turbine inlet in the region of the outlet opening between the additional duct and the compressor or turbine inlet.

4. Internal combustion engine according to claim 2, wherein a throttle device is introduced in the region of the outlet opening between the additional duct and compressor or turbine inlet.

5. Internal combustion engine according to claim 4, wherein the throttle device is a guide vane cascade which variably adjusts the cross section of the outlet opening.

6. Internal combustion engine according to claim 2, wherein the additional duct is guided to the air-driven turbine through a heat exchanger for preheating the air to be supplied.

7. Internal combustion engine according to claim 1, wherein the inlet flow direction encloses an angle, with the main flow direction through the compressor or turbine inlet in the region of the outlet opening between the additional duct and the compressor or turbine inlet.

8. Internal combustion engine according to claim 7, wherein a throttle device is introduced in the region of the outlet opening between the additional duct and compressor or turbine inlet.

9. Internal combustion engine according to claim 8, wherein the throttle device is a guide vane cascade which variably adjusts the cross section of the outlet opening.

10. Internal combustion engine according to claim 1, wherein a throttle device is introduced in the region the outlet opening between the additional duct and compressor or turbine inlet.

11. Internal combustion engine according to claim 10, wherein the throttle device is a guide vane cascade which variably adjusts the cross section of the outlet opening.

12. Internal combustion engine according to claim 11, wherein the guide vane cascade has adjustable guide vanes.

13. Internal combustion engine according to claim 11, wherein an adjustable shut-off element is provided in the additional duct in addition to the guide vane cascade.

14. Internal combustion engine according to claim 13, wherein the shut-off element is an axially displaceable matrix which has recesses for accommodating the guide vane cascade.

15. Internal combustion engine according to claim 1, wherein the air-driven turbine is an autonomous component independent of the compressor.

16. Internal combustion engine according to claim 15, wherein the air-driven turbine is directly adjacent to the compressor.

17. Internal combustion engine according to claim 15, wherein the air-driven turbine is directly adjacent to the exhaust gas turbine.

18. Internal combustion engine according to claim 1, wherein the additional duct is guided to the air-driven turbine through a heat exchanger for preheating the air to be supplied.

19. Internal combustion engine according to claim 18, wherein the heat energy of the heat exchanger is derived from the exhaust gases downstream of the exhaust gas turbine.

20. Method of operating an internal combustion engine having an exhaust gas turbocharger with an exhaust gas turbine and a compressor for generating compressed boost air, having an additional, air-driven turbine, which is torsionally connected to the compressor and to which combustion air can be supplied via an adjustable shut-off element, the turbine outlet being connected to a duct section communicating with the compressor outlet, wherein, in a lower load range, in a case where the required boost pressure falls below a threshold value, at least a partial flow of the induced combustion air is guided via the air-driven turbine.

21. Method according to claim 20, wherein below the threshold value for the required boost pressure, the air supply to the compressor inlet is shut off.

22. Method according to claim 20, wherein the air-driven turbine and the compressor are configured as a one-piece component with a common casing, and wherein the additional duct opens into the compressor inlet level with the compressor impeller.

23. Method according to claim 20, wherein the air-driven turbine is an autonomous component independent of the compressor.

24. Method according to claim 23, wherein the air-driven turbine is directly adjacent to the compressor.

25. Method according to claim 23, wherein the air-driven turbine is directly adjacent to the exhaust gas turbine.

* * * * *